United States Patent [19]
Chen et al.

[11] Patent Number: 5,721,823
[45] Date of Patent: Feb. 24, 1998

[54] DIGITAL LAYOUT METHOD SUITABLE FOR NEAR VIDEO ON DEMAND SYSTEM

[75] Inventors: Shenze Chen, Cupertino; Manu Thapar, Fremont, both of Calif.

[73] Assignee: Hewlett-Packard Co., Palo Alto, Calif.

[21] Appl. No.: 536,884

[22] Filed: Sep. 29, 1995

[51] Int. Cl.$^6$ .................................................. H04N 1/42
[52] U.S. Cl. ........................................ 395/200.33; 348/7
[58] Field of Search ......................... 364/514 R; 395/404, 395/438, 439, 441, 821, 200.08, 200.33; 360/97.01, 97.03; 348/6, 7, 10, 17

[56] References Cited

U.S. PATENT DOCUMENTS

| | | | |
|---|---|---|---|
| 5,551,003 | 8/1996 | Mattson et al. | 395/463 |
| 5,586,264 | 12/1996 | Belknap et al. | 395/200.08 |

FOREIGN PATENT DOCUMENTS

| | | | |
|---|---|---|---|
| 625858A1 | 5/1993 | European Pat. Off. | H04N 7/173 |
| 673160A1 | 3/1995 | European Pat. Off. | H04N 7/00 |
| WO 96/13125 | 5/1996 | WIPO | H04N 7/173 |

OTHER PUBLICATIONS

W. D. Sincoskie, "System Architecture for a Large Scale Video on Demand Service", Computer Network and ISDN Systems, 22, Sep. 1991, No. 2, pp. 155–162.

Yitzhak Birk, "Deterministic Load–Balancing Schemes for Disk–Based Video–On–Demand Storage Servers", Fourteenth IEEE Symposium on Mass Storage Systems, Nov. 9, 1995, pp. 17–25.

A. L. Narasimha Reddy and Jim Wyllie, "Disk Scheduling in a Multimedia I/O System", IBM Almaden Research Center, pp. 225–233.

Primary Examiner—Emanuel T. Voeltz
Assistant Examiner—Thomas Peeso

[57] ABSTRACT

A method for layout of digitized media, movies, especially on discs, whereby storage capacity and bandwidth are optimized and near video on demand is accomplished. Several embodiments are taught, including request stimulated near video on demand model which employs the inventive layout strategy taught.

12 Claims, 10 Drawing Sheets

DIGITAL LAYOUT METHOD SUITABLE FOR NEAR VIDEO ON DEMAND SYSTEM

FIELD OF THE INVENTION

This invention relates to the layout of digitized performances and in particular the layout of performances on storage medium according to a method which optimizes bandwidth and storage medium in a Near Video On Demand (NVOD) system, resulting in a highly efficient server system.

BACKGROUND OF THE INVENTION

Near video on demand, or "NVOD", provides customers with a service distinct from true video on demand. True video on demand, "TVOD", requires a server that is able to respond to customer requests immediately. Not only do customers expect any selected movie or program to be available immediately, a truly "on demand" system enables customers to control all aspects of the viewing experience much the same way a VCR allows a viewer to fast forward or backwards or pause at the viewer's whim. Customer's requests arrive at the server randomly, thus making the input output workload on the storage subsystem quite unpredictable. Near video on demand, however, typically broadcasts a program periodically, say, every ten minutes. If a customer misses the start of a program broadcast, the customer may simply wait a short interval until the next broadcast interval much like any commuter merely waits for the next scheduled bus. By providing scheduled performance intervals, near video on demand servers provide customers the ability to travel forward or backward in a given performance in increments equal to the broadcast interval. Using the above example of a ten minute broadcast interval, a customer could jump forward or backward in increments of ten minutes simply by jumping among the staggered start streams. Near video on demand capability, while desirable to customers, does not provide customers all the instant control features of true video on demand. Not surprisingly, consumers are not willing to pay nearly as much for near video on demand as they might pay for true video on demand. Therefore, to effectively compete, near video on demand must be provided more cheaply than true video on demand. Controlling server cost is one of the most effective ways of ensuring competitively priced service. Since disk cost accounts for a significant percentage of system cost, methods of efficient use of disk space and reducing system cost are sought.

SUMMARY OF THE INVENTION

The invention herein provides a video data layout strategy that supports efficient use of disk bandwidth. In addition the method of video layout taught herein further provides for sequential disk access and efficient matching of disk bandwidth with needed broadcast bandwidth. The method taught herein further provides several alternative layout strategies for optimal use of disk bandwidth, including two denominated by the inventor as Segment-Group Pairing (SGP) and Disk Pairing (DP). The invention also provides a model for request initiated broadcast wherein bandwidth is conserved. The above advantages are achieved by subscribing to some basic tenets of a video layout strategy taught herein. In particular, the length of a performance or program is determined and the desired broadcast interval selected. From the relationship between the program length and the broadcast interval the number of broadcast streams per movie is determined. The terms "movie" or "video" or "performance" are used interchangeably to mean any work or performance of definable length which can be represented and transmitted in digital form. Likewise, although many of the examples provided herein refer to disk type storage media, any digital storage device, such as tape or compact disk (CD), may be used to practice the invention taught herein.

The invention further provides a layout strategy whereby a single disk or RAID (Redundant Array of Inexpensive Disks) device contains an entire performance. In a true video on demand system, movies are typically striped across multiple disks for the purpose of load balancing. This prevents a popular movie from making a single disk a bottleneck. For near video on demand, however, the input/output (I/O) workload for a movie is determined solely by the broadcast interval, not by viewer demand (instances of request). Therefore, once the broadcast repeat interval for a movie is determined and the bandwidth requirement can be satisfied by a single disk, placing a movie on a single disk will not cause any "bottleneck" problem as found in the case of true video on demand. Determining the broadcast repeat interval depends on many factors, not the least of which is popularity of a given movie because it makes sense to broadcast popular movies more frequently than less popular movies.

In cases where bandwidth requirement cannot be satisfied by a single disk, this strategy can be easily extended to store a movie on two or more disks and use the aggregate bandwidth of multiple disks to meet the requirement. If the bandwidth requirement is sufficiently less than the disk's bandwidth, the strategy can be extended to interleave multiple movies on a single disk to fully utilize the disk's bandwidth.

BRIEF DESCRIPTION OF THE DRAWINGS

The drawings herein described are numbered with corresponding numbers appearing in different Figures representing the same structure with the same number.

DETAILED DESCRIPTION OF THE PREFERRED EMBODIMENT

Figure 1A:
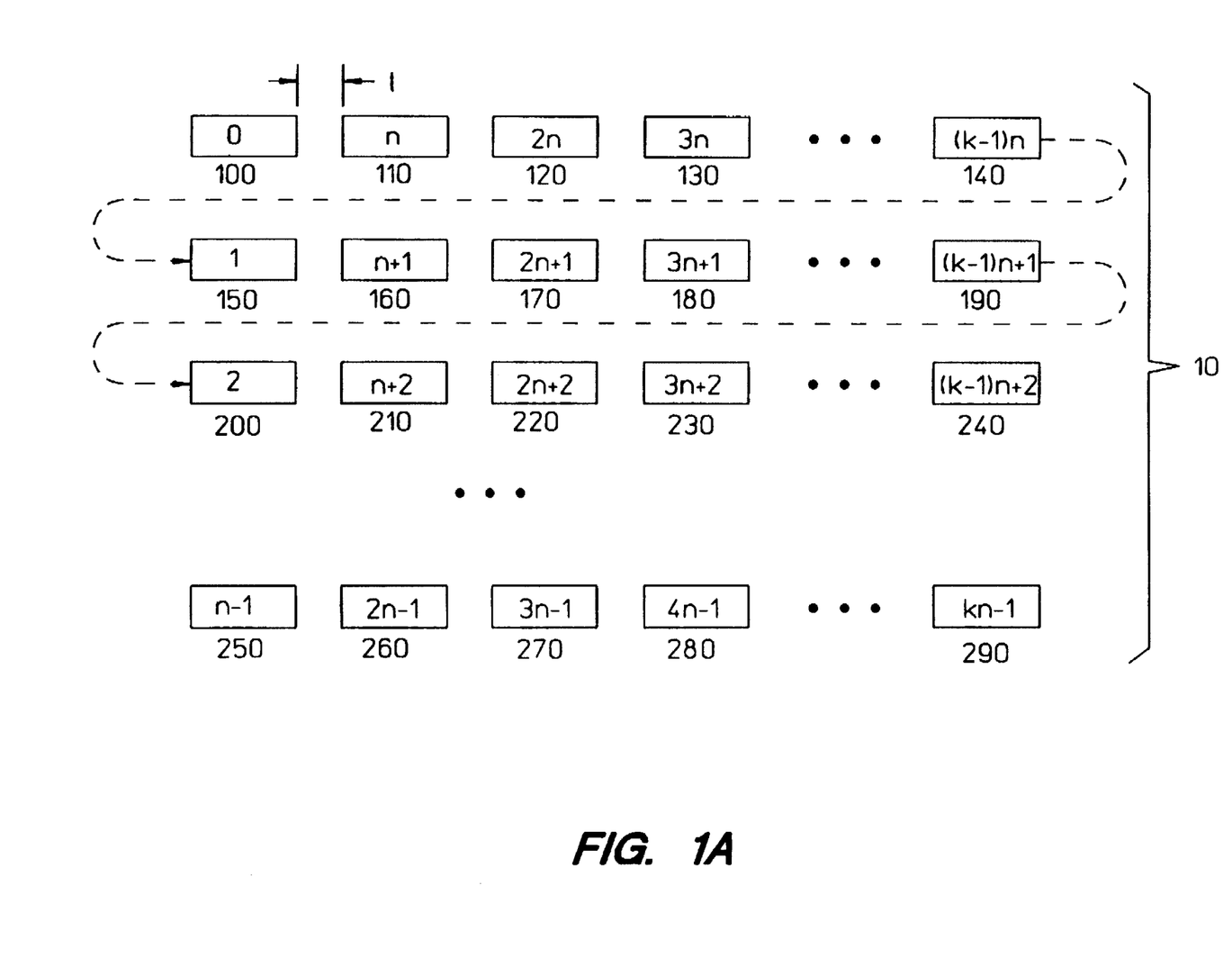
FIGS. 1A–1D are schematic illustrations of the layout according to the invention taught herein.

A disk can be considered to be a series of repository logic blocks, with a typical logic block size of 512 bytes. Contiguous logic blocks are usually mapped into contiguous physical blocks except for defect blocks or cylinder and track skews. A segment is defined as the size of data transfer for one input/output request, and which may contain multiple logic blocks. FIG. 1A illustrates segment layout on a disk where the segments comprise a digitized movie or other performance. The inventive layout strategy 10 breaks a movie into segments and arranges these segments on a disk according to the order shown in FIG. 1A.

According to this strategy illustrated in FIG. 1A, segment zero "0" 100 is followed by segment "n" 110, followed in turn by segments "2n" 120, segment "3n" 130, . . . , through segment "(k−1)n" 140, which in turn is followed by segment "1" 150 and so forth. The variable n is the number of segments to be played back during a repeat interval for each stream, and the variable k is the number of simultaneous or concurrent broadcast streams of a movie, k being determined by dividing the total length of the movie (L) by the broadcast repeat interval (t).

When a movie is broadcast, the disk or other digital storage media is read sequentially from the initial logic block 100, segment by segment, until the last segment ("kn−1" 290 in FIG. 1A) and then the disk arm moves back to the beginning of the disk and the access pattern is repeated. Thus the disk arm repeatedly sweeps across the disk surface from outermost track to innermost track and sequentially reads the data. This technique eliminates disk seeks (when the storage device is a disk) with the single exception of the seek from the innermost to the outermost track.

Storing a single movie on a single disk provides easy management of broadcasts. To broadcast a movie, only a single disk need be loaded or re-loaded. Disk failure creates a broadcast loss of only one movie: the remainder of the movies are not necessarily effected as would be the case if, as in the current layout practice, movies were striped across multiple disks.

The layout system models the NVOD server as broadcasting many movies or other digitized programing simultaneously. Each movie can have different bit-rate and repeat intervals. Given a movie and its repeat interval, the number of streams for this movie can be calculated as in the following example:

$$k = \left\lceil \frac{L}{t} \right\rceil \quad (1)$$

Example:
where  L = movie length (minutes)
        t = repeat interval (minutes)

$$k = \frac{120 \text{ minute movie stream}}{10 \text{ minute repeat interval}}$$

k = 12 movie streams

Figure 2:
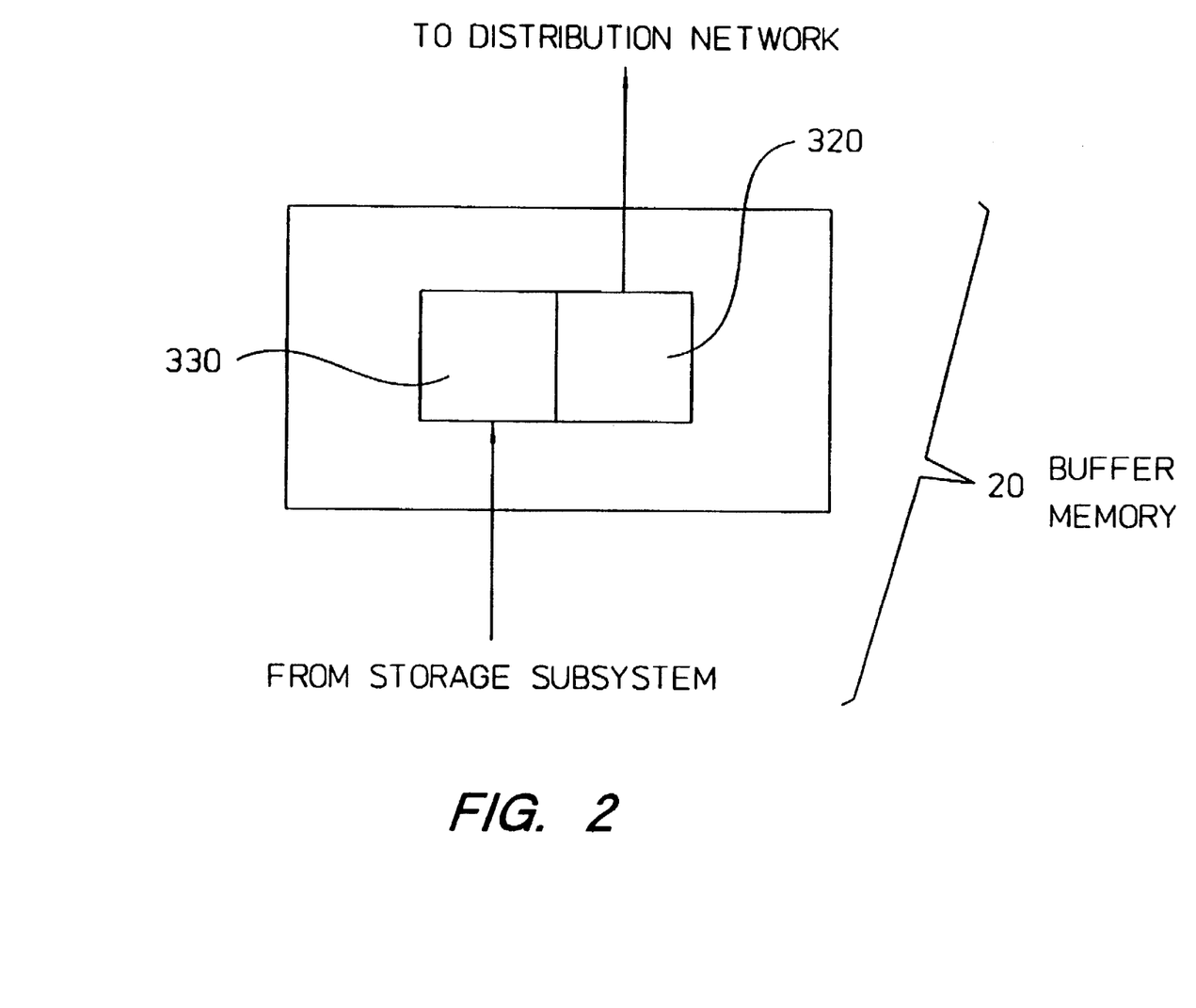
FIG. 2 represents the buffer memory structure between the storage subsystem and the distribution network according to the preferred embodiment.

For each stream, a certain amount of buffer space is allocated in the system memory as represented by FIG. 2.

A plurality of buffers per stream may be used. The greater the number of buffers the more certain the stream will not be interrupted, and the greater the cost of the system. Two buffers per stream is the minimum and, therefore, the most economical. FIG. 2 depicts a pair of buffers operating as a "ping pong" buffer 20 for any broadcast stream useful in an NVOD system as taught herein. While a first buffer 320 is transmitting data to the distribution network, a second buffer 330 is filled from the disk. When the first buffer 320 finishes transmitting, the system switches to the second buffer 330 and issues a read command to fill the now freed first buffer 320.

The transmit time of a segment, T, depends on the segment size, S, and the transmit rate, r:

$$T = \frac{S}{r} \quad (2)$$

The number of segments to be played back during the a repeat interval is given by $$n = \left\lceil \frac{tr}{S} \right\rceil \quad (3)$$

Figure 3:
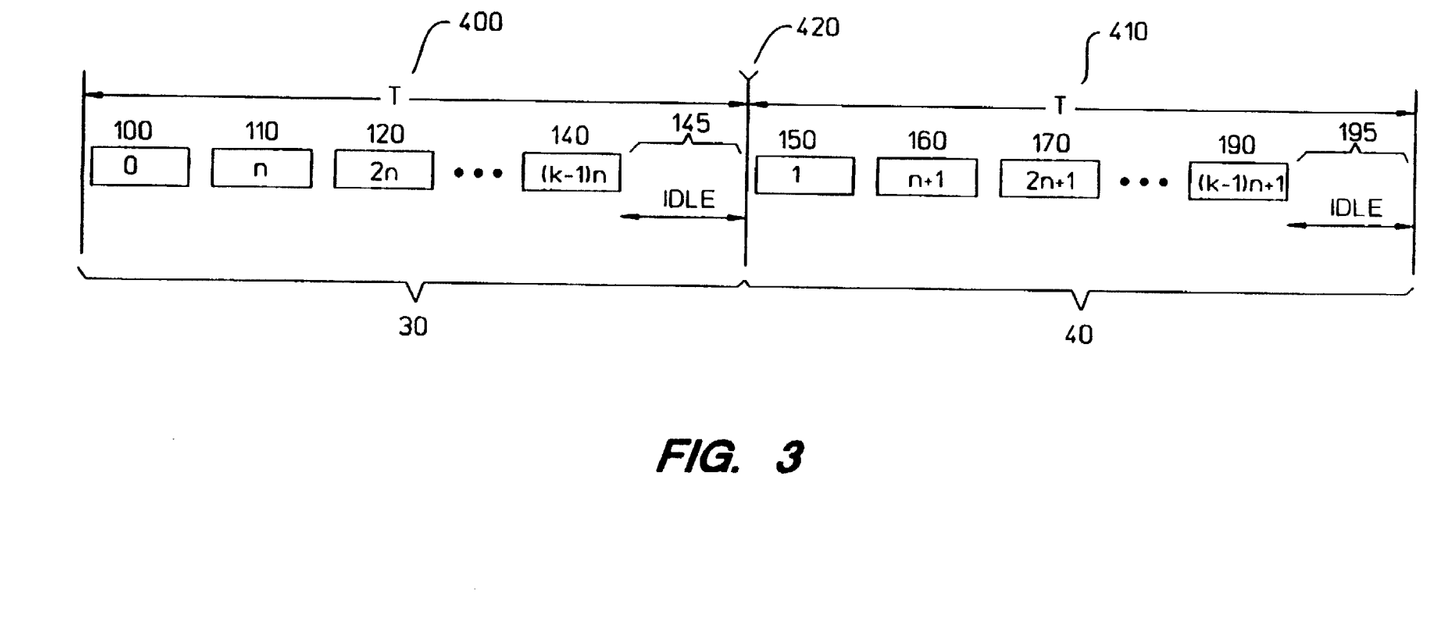
FIG. 3 is a schematic representation of the relationship between a service round, and the playback time of the round, T, as a function of the bit rate, r, according to the invention taught herein.

Referring again to FIG. 1A, segment 0 and n are t minutes apart in a stream. A sequential read of k segments of data is considered a "service round". For example, the reading segments 0, n, . . . , (k−1)n constitutes one service round. FIG. 1A depicts n service rounds. FIG. 3 depicts two service rounds, 30 and 40 respectively. Within each service round 30, 40 each segment read belongs to a different stream of the same movie. Because of the back and forth or "ping pong" characteristics, each service round must finish within a buffer playback time of T. Each service round starts (i.e. an I/O request is issued) precisely at the T period boundary (420 in FIG. 3). In this way, the disk arm sweeps from logic block 0 (the outermost zone) to the last logic block devoted to the movie (in the inner zone) in t minutes (where t=nT), and then jumps back to logic block 0 and sweeps again. Thus the variable n also represents the number of service rounds in one sweep.

During any service round, the retrieval of k segments in any given service round may be finished in less than the service round period T. Referring to FIG. 3, in this case, the disk is idle 145 because in the "ping pong" structure, as illustrated in FIG. 2, there is no buffer available for the next data transfer. Other additional buffers may, of course be added with predictable results that are not discussed here but are readily apparent to those familiar with the art. An optimized design should minimize this idle period in order to fully utilize the disk bandwidth. Fortunately, because the invention as taught provides for sequential disk access, the time for retrieval of k segments is basically determined by the disk data transfer time and not by disk seek time and rotational latency and therefore is more predictable than for random accesses as found in most TVOD systems.

Bandwidth Requirements

In the model discussed above as illustrated in FIGS. 1 through 3 collectively, the disk is required to sequentially read k segments every time period T. This requires the disk or other digital storage device to provide minimum sustained sequential read bandwidth of $$B = \frac{kS}{T} \quad (4)$$

$$= \frac{Lr}{t}$$

High disk capacity is achieved with the zone bit recording technique which provides higher bandwidth in outer zones than inner zones. The disk inner zone band widths (rather than merely the disk average bandwidth) must meet the above requirements.

$$B = \frac{Lr}{t} \leq \text{Disk Bandwidth} \quad (5)$$

Example One

The sustained sequential read Disk-Bandwidth for one of the current drive ranges from 5.1 to 6.9 MB/sec, depending on whether it is accessing inner or outer zones. This allows a single such drive to support broadcast of a two-hour movie coded at a rate of 3 Mb/sec at a minimum of 8.8 minute intervals. If the movie is to be broadcast at 5 minute intervals, then two disks are needed.

Capacity Requirement

The capacity requirement for storing an L minute movie on a disk is straightforward $$C = Lr \quad (6)$$

For example, a 4 Gbyte drive can store a three hour movie coded at 3 Mb/sec rate or a 2.2 hour movies coded at a 4 Mb/sec rate.

With such bandwidth and capacity requirements for movie storage and broadcast, a disk can be selected that most economically accommodates the required disk space. Extra disk bandwidth or capacity will be wasted. A disk with a bandwidth that exceeds requirements will have a longer idle period (145 as depicted in FIG. 3). Moreover, disks need not be homogeneous. A fast disk may store a high bit rate movie or a movie with a shorter repeat interval; a slower disk may store a low bit rate movie. Thus, the system administrator may exercise greater flexibility in leveraging existing disk drives.

Buffer Requirements

The examples presented hereinabove assume a ping pong buffer for each stream (not each movie) with the buffer segment size S equal to the disk I/O transfer size. The size S immediately determines the service round period T for a given movie bit rate (see equation 2). One of the recommended segment size is 128 Kilobyte. A smaller S results in lower buffer costs but may increase the system overhead, since more I/O requests, interrupts, and context switches will be generated, which may result in higher CPU and I/O channel utilizations. Any such tradeoff must, of course, be carefully evaluated.

Changing the Broadcast Repeat Interval

Figure 1B:
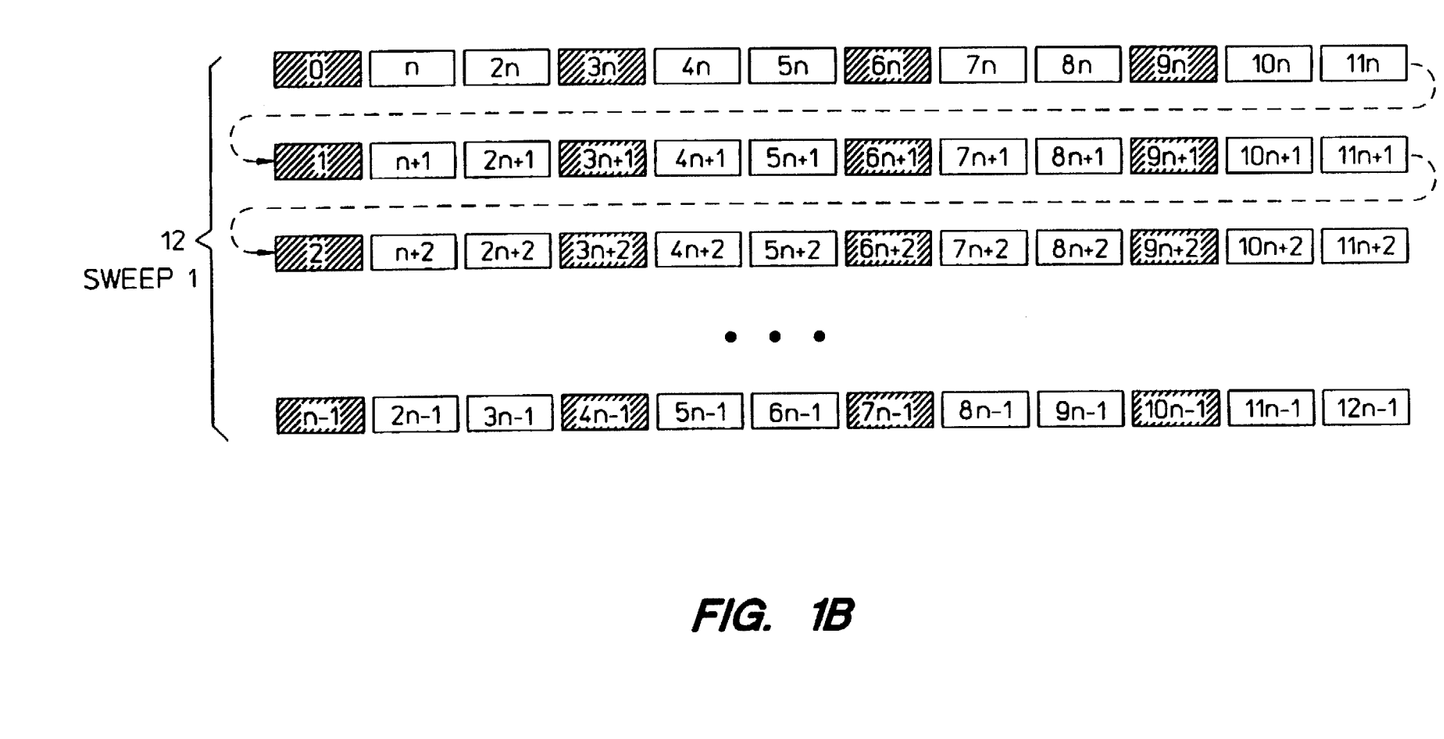

It is sometimes the case that the broadcast repeat interval of any given movie will vary at different times of the day or week. For example, a movie may be broadcast at a longer repeat interval in the afternoon (when demand is lower) than in the evening. With the video layout strategy described herein it is easy to change the broadcast repeat interval, t, while leaving the layout scheme intact. Specifically if a disk is laid out according to the method taught herein so as to be capable of supporting broadcast repeat interval t, then the same disk can be used to support broadcast at intervals 2t, 3t, ..., (k−2)t, ... by skipping some segments in each service round. For example, a current drive can support broadcasting a two hour movie coded at a 3 Mb/sec rate at 10 minute intervals (t=10; k=12). Referring to FIG. 1B, a broadcast every ten minutes would require the disk arm to read from block zero through block 12n−1 and return to the outermost block zero each ten minutes.

To broadcast at, say, a 30 minute interval (k=4) during the lower demand afternoon time period, the same disk layout as depicted in FIG. 1B, is merely read somewhat differently. The arm still performs one sweep in 10 minutes, but only selected segments are read each service round. The first sweep 12 has segments 0, 3n, 6n and 9n read followed by 1, 3n+1, 6n+1, and 9n+1, then 2, 3n+2, 6n+2 and 9n+2, continuing through to the last segment read, 10n−1. The second sweep 14 (FIG. 1C) has segments n, 4n, 7n, 10n read followed by n+1, 4n+1, 7n+1, 10n+1, continuing through n+2, 4n+2, 7n+2 and 10n+2, continuing similarly until the last segment read, 11n−1. The third sweep 16 (FIG. 1D) has segments 2n, 5n, 8n and 11n read followed by segments 2n+1, 5n+1, 8n+1 and 11n+1, continuing similarly until the last segment read, 12n−1.

Figure 1C:
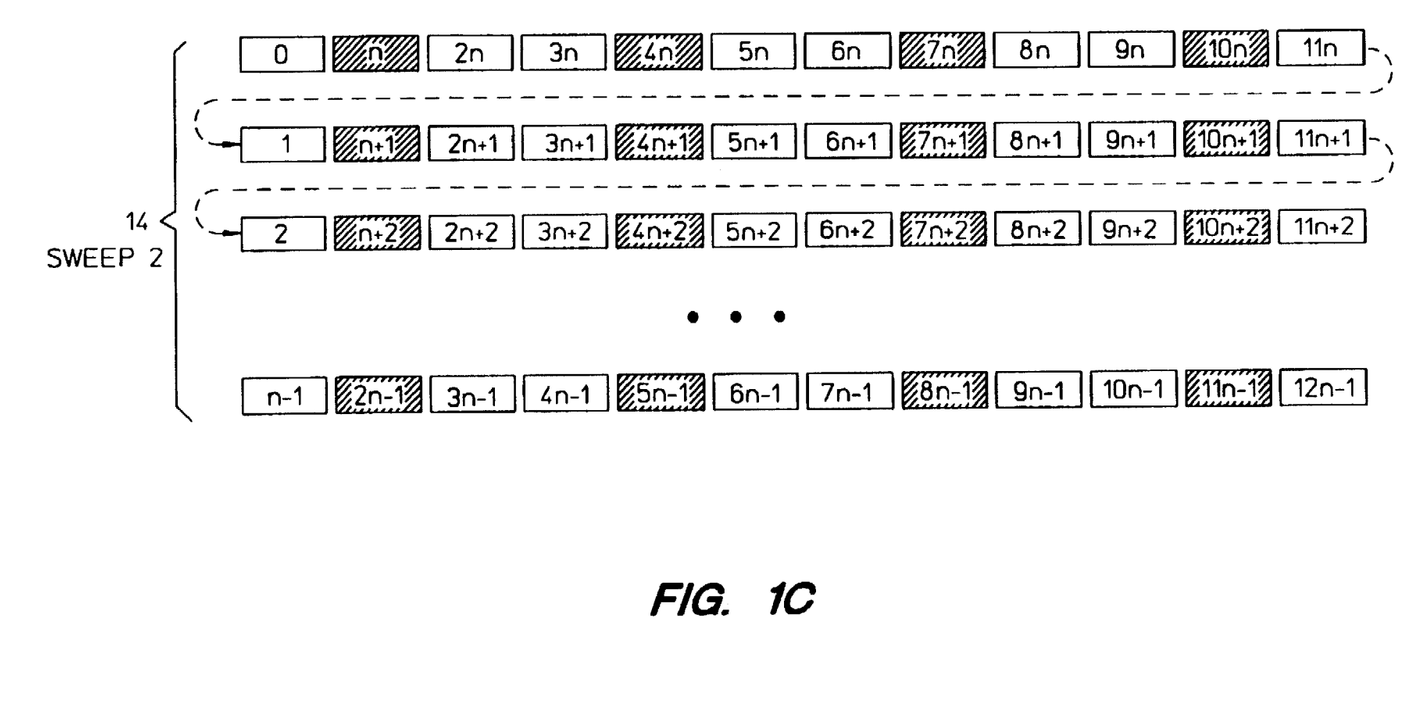
Figure 1D:
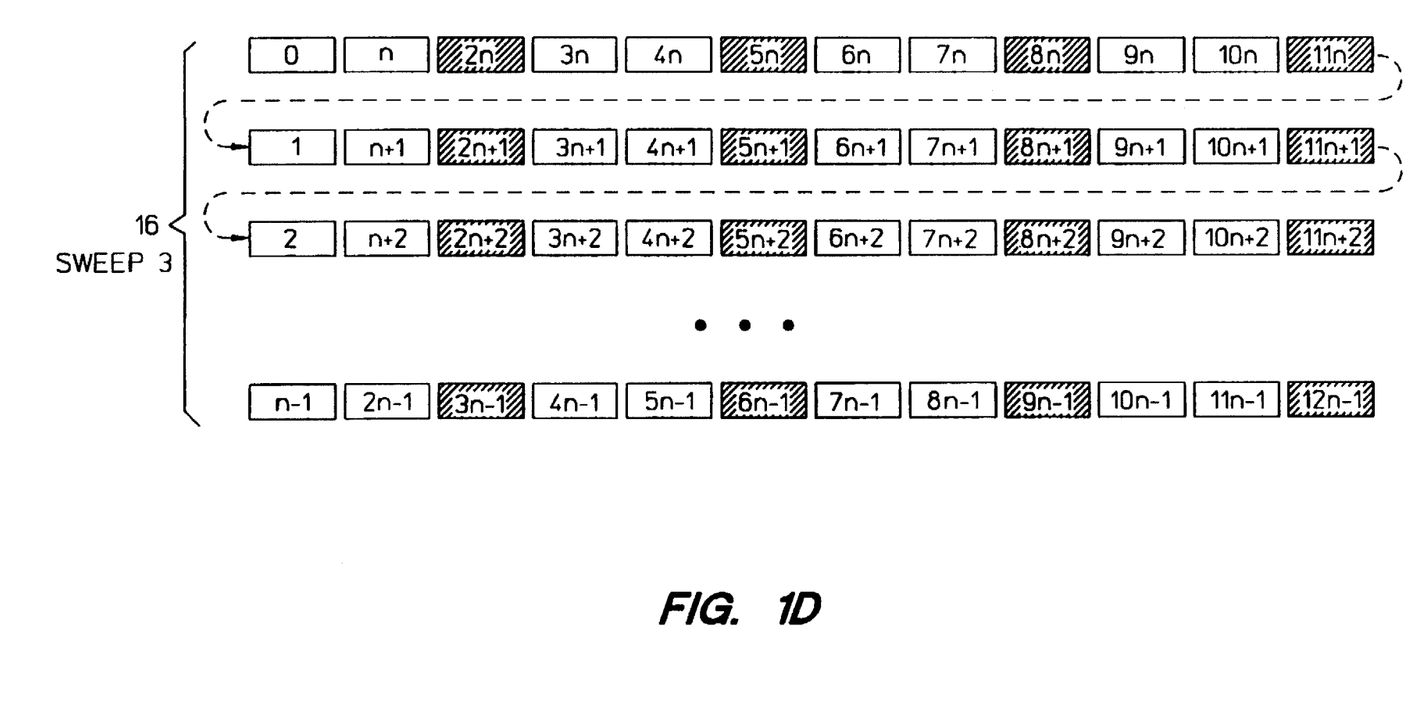

The above read pattern repeats every three sweeps. Thus in each service round, T, only 4 segments are read and each segment is read once every three sweeps. Because each sweep takes ten minutes (the repeat interval) a new stream starts every thirty minutes. This assures the broadcast of the movie at 30 minute intervals.

Matching the Disk Bandwidth Requirements

The example so far have demonstrated the application of the strategy in circumstances where a single movie is placed upon a single disk. In other circumstances, a movie ought be placed on multiple disk or multiple movies on a single disk in order to best match the available disk bandwidth with the bandwidth requirement for the broadcast.

Placing a Movie on Multiple Disks

If a single disk cannot meet either the bandwidth or the capacity requirements for a movie, then two or more disks are needed to store the movie. Determining how much disk capacity is required is a straightforward task. If a single disk capacity is insufficient to hold an entire movie, additional disk space is needed. Typically, MPEG-2 movie streams are coded at rates in the range of 1.5–8 Mb/sec. In 1995 disk technology, 9 GB disks are already available that can hold 2.5 hour movies coded at 8 Mb/sec rate. Therefore, capacity may soon no longer pose serious limitations.

Current state of the art disk drives can only support broadcast bandwidth of a movie coded at 3 Mb/sec at a minimum interval of 8.8 minutes according to the basic layout strategy presented herein. For any interval shorter than 8.8 minutes, two or more disks may be employed. For example, if one wants to broadcast a 4 GB movie at 5 minute intervals, one can:

1) Use two 4 GB disks, each disk configures independently to support a broadcast at a ten minute interval. The two disks are synchronized in such a way so that they start to play at an offset of 5 minutes.
2) Use two 2 GB disks, and stripe the movie on the two disks by placing segments 0, 2n, 4n, on disk 1 and segments n, 3n, 5n, ... on disk 2 (refer to FIG. 1B). The two disks start to sweep simultaneously that the bandwidths of the two disks are aggregated to meet the requirement.

While the first of the two strategies above requires double the storage capacity, it provides fault tolerance in the sense that when one disk fails, the system is still broadcasting the movie although at a longer repeat interval. Strategy 2 can lower the system cost but if any one disk fails, the entire movie stops.

Placing Multiple Movies on a Single Disk

In contrast to the example presented above, if a disk's bandwidth and capacity exceeds the required bandwidth for broadcasting a movie, several alternatives are available: 1) multiple movies may be placed on a single disk to fully utilize bandwidth; 2) select a less costly disk with a lower bandwidth and capacity.

Figure 4:
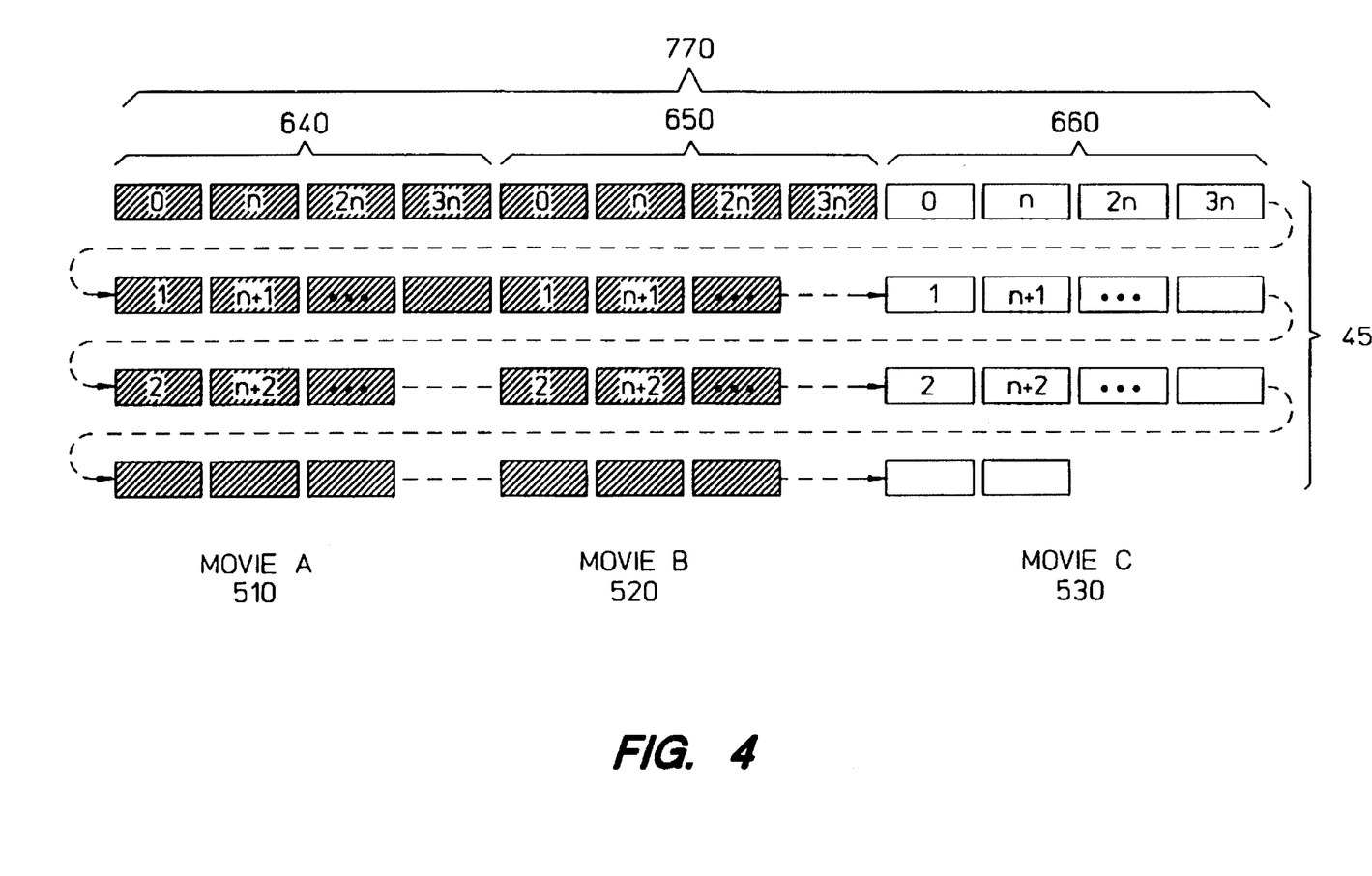
FIG. 4 is a schematic representation of an alternate embodiment of the invention taught herein wherein multiple performances are placed in a predetermined pattern on the disk storage medium.

Hereinabove it was demonstrated that a current drive can easily support broadcasting a two hour movie coded at a 3 Mb/sec rate at a repeat interval of ten minutes, which implies one such disk can support twelve movie streams by using the proposed basic layout strategy. If movies are to be broadcast at thirty minute intervals, which results in four streams per movie (k=4), the same disk layout strategy may be used as for the ten minute interval with the broadcast strategy as described hereinabove to broadcast the movie at thirty minute intervals. But 67% of the available disk bandwidth is underutilized or wasted. For cases where it is known that a movie will not to be broadcast more frequently than, say, once every thirty minutes, three or more movies may be placed on a single disk to fully utilize the disk bandwidth. With the average movie length of 2 hours, (e.g. 2.7 GB per movie) a 9 GB drive can be used to hold three movies. Using the basic layout strategy taught herein, the movies are "interleaved" or laid out in alternating segment series of predetermined lengths. FIG. 4 depicts an alternate layout strategy according to the invention taught herein, wherein movie segments from three movies, denoted as A 510, B 520 and C 530 respectively are "interleaved".

During each service round, T, twelve segments are read from the disk, four segments from each movie. For example, the first service round 770 comprises a first set of four segments 640 from movie A 510, a second set of four segments 650 from movie B 520, and a third set of four segments 660 from movie C 530. FIG. 4 further illustrates that movie lengths do not necessarily have to be the same. When one stream reads and displays the last segment of a movie, it stops and waits for the next start time (at thirty minute boundaries). By using large capacity drives, system cost can be lowered because 9 GB drives are cheaper than 2 or 4 GB drives in terms of dollars per megabyte.

Disk Optimization Strategies

As discussed above and depicted in the Figures herewith, the invention taught herein provides a basic layout strategy for near video on demand (NVOD) servers. Further layout schemes based on the basic layout strategy are also taught herein. With zone bit recording technique, disk outer zones have higher bandwidth than inner zones. As stated earlier, the basic layout strategy calculations must be based on the inner disk bandwidth. The implication is that the greater bandwidth of the outer zones is wasted because the idle periods for accessing the outer zones will be longer than for the inner zones. Table 1 summarizes the measured sustained sequential bandwidths for a current drive. The bandwidth for the outermost zone may be as much as 35% higher than the innermost zone.

TABLE 1

Zone Bandwidth for a current Drive

| Zones | Number of Cylinders | Sustained Sequential Bandwidth (MB/s) |
|---|---|---|
| Zone 1 (outer) | 1877 | 6.91 |
| Zone 2 | 955 | 6.91 |
| Zone 3 | 48 | 6.65 |

TABLE 1-continued

Zone Bandwidth for a current Drive

| Zones | Number of Cylinders | Sustained Sequential Bandwidth (MB/s) |
|---|---|---|
| Zone 4 | 309 | 6.47 |
| Zone 5 | 348 | 6.14 |
| Zone 6 | 115 | 5.90 |
| Zone 7 | 213 | 5.73 |
| Zone 8 | 189 | 5.53 |
| Zone 9 | 130 | 5.30 |
| Zone 10 (inner) | 206 | 5.10 |

Alternate Embodiment: Segment Group Pairing (SGP) Strategy

Figure 5:
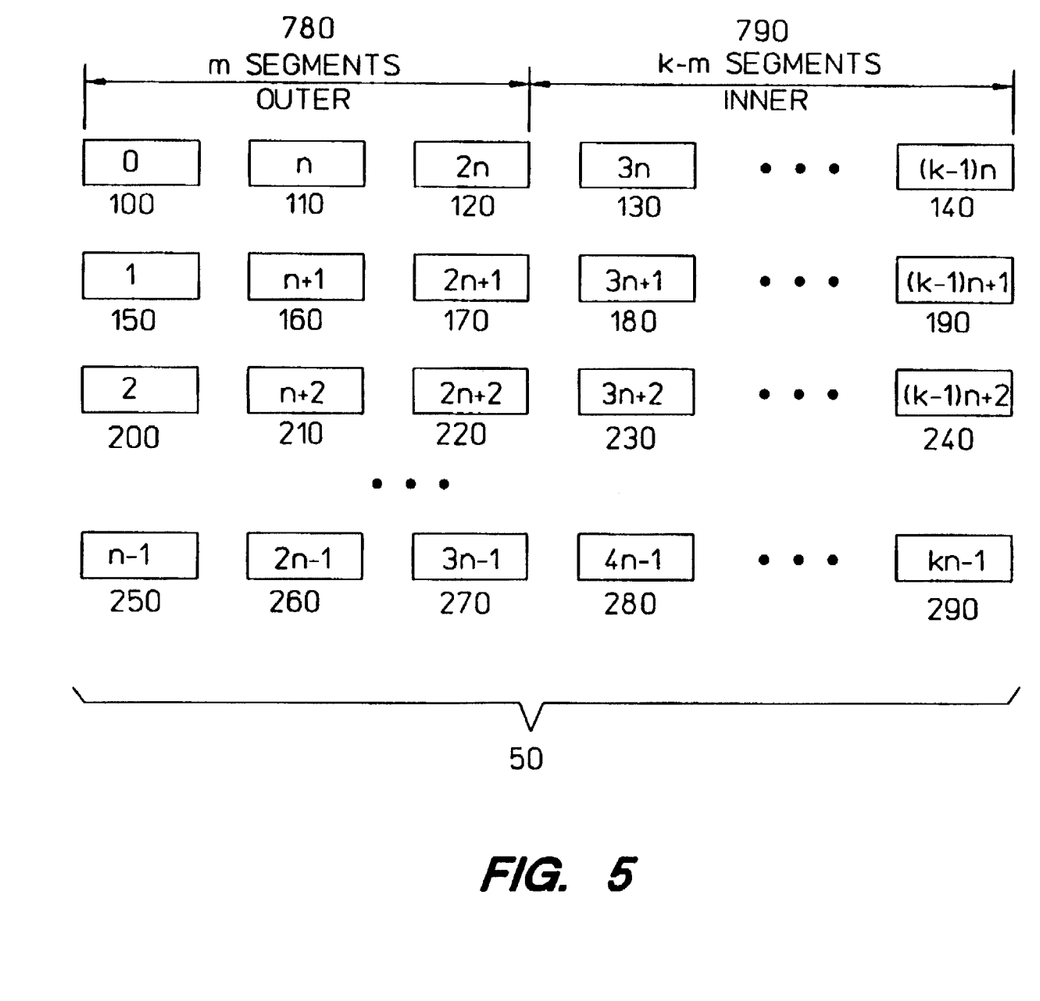
FIG. 5 is a schematic representation of an alternate embodiment of the invention taught herein wherein segment groups are paired in a predetermined pattern across available storage medium capacity in order to most efficiently utilize available capacity and meet broadcast objectives.

In Segment Group Pairing, SGP 50, as schematically depicted in FIG. 5, a segment group of m segments in an outer zone 780 is "paired" with a segment group of k–m segments in an inner zone 790. Conceptually, this pairing notion is similar to "track pairing" wherein outer tracks are paired with inner tracks. Segment groups, however, may be defined in different ways. For example, the first row (representing one service round) of k segments in FIG. 5 may be divided into two groups m, and k–m and thereby comprise a segment group pair m; k–m. The two segment groups are placed on the disk as follows: group m in the outer zone 780, group k–m placed in the inner zone 790. Other pairing methods will be obvious to one with skill in the art, and the discussion herein is meant to be illustrative and not limiting the inventive application.

How Segment Group Pairing Works

A layout method utilizing segment group pairing works as follows:

During each service round, T, the disk arm reads the first group in the outer zone (m) 780. The arm then seeks its way to the paired group in the inner zone 790. After rotational latency, the arm reads the second group (k–m), then returns to the outer zone, seeking the next group in sequence and waits for the next service round. The overall tradeoff is that of two seeks and rotational latencies per service round for the decreased transfer time due to the higher bandwidth of the outer zones. If the overall effective sustained bandwidth is higher than the inner zones bandwidth, then segment group pairing layout is preferable to the basic sequential read strategy. If no advantage is gained, then, assuming all things being equal, the basic layout should be used.

To determine which layout strategy is optimal, let Bmax and Bmin be the disk outermost and innermost bandwidths, and MAX_SEEK, MAX_ROT be the maximum seek time and rotational latency (note: this is the worst case scenario). The effective bandwidth achievable by using the SGP strategy is given by the size of the group pairs divided by the time used to read the group pairs, which includes the data transfer time for the two groups plus the time for two seeks and two rotational latencies.

$$Beff = \frac{Sk}{\left[ Sk \left( \frac{m/k}{Bmax} + \frac{1-m/k}{Bmin} \right) + 2(MAX\_SEEK + MAX\_ROT) \right] \frac{1024}{1000}} \quad (7)$$

$$= \frac{1}{\left[ \left( \frac{m/k}{Bmax} + \frac{1-m/k}{Bmin} \right) + 2048(MAX\_SEEK + MAX\_ROT) \right] \frac{1}{100 \, Sk}}$$

where Sk gives the data size to be transferred for the group pair. From the above equation, it is obvious that the bigger the Sk, the better the Beff. For a given k (which is determined by movie length L, and broadcast repeat interval t, as shown in equation (1)), this implies a bigger buffer size S.

Example Two:

For a current drive, Bmax=6.9 MB/sec, Bmin=5.1 MB/sec, MAX_SEEK=16.5 ms, MAX_ROT=8.34 ms. Then for a two hour movie broadcast at t=10 minutes, if we divide each row of FIG. 1A into two groups of equal size, (m/k=0.5) the achievable effective bandwidths by the SGP strategy are as follows:

TABLE 2

| Effective Bandwidth of SGP Strategy | |
|---|---|
| Buffer Size Stream (S) | Effective Bandwidth (Beff) |
| 64K (× 2) | 4.24 MB/sec |
| 128K (× 2) | 4.90 MB/sec |
| 256K (× 2) | 5.36 MB/sec |

It has been shown hereinabove that the basic layout strategy can utilize a maximum of 5.1 MB/sec of disk bandwidth with segment size of 128K (or even 64K). Table 2 supports the conclusion that the SGP strategy can do a better job in terms of disk bandwidth utilization than the basic strategy (5% improvement in above case) but at a cost of doubling the buffer requirement. The memory to disk bandwidth tradeoff must be taken into account.

Alternate Embodiment: The Disk Pairing (DP) Strategy

Figure 6:
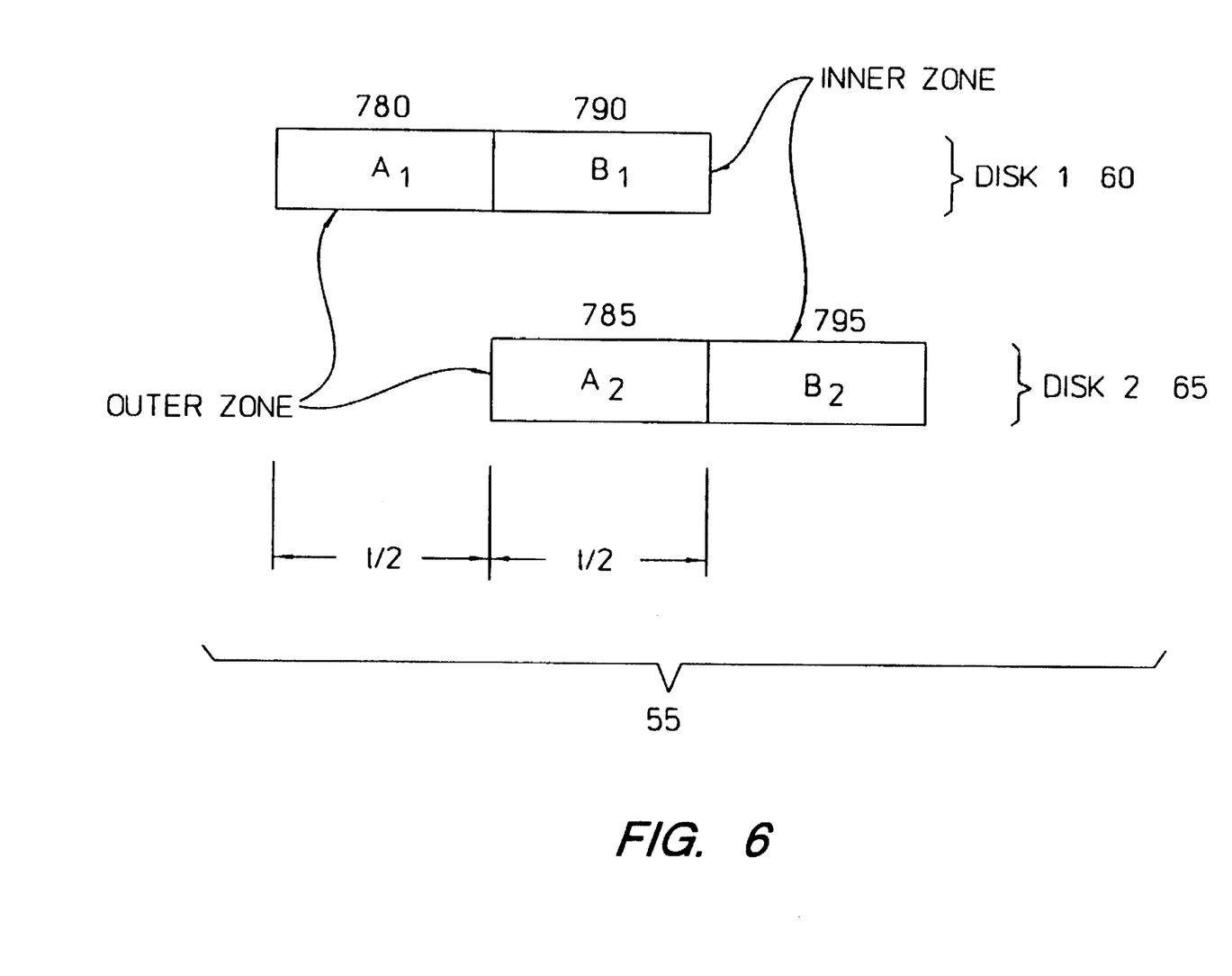
FIG. 6 is a schematic representation of an alternate embodiment of the invention taught herein wherein digitized performances are arranged in a predetermined sequence across a plurality of storage devices in order to most efficiently utilize available capacity and meet broadcast objectives.

Another derivative of the basic layout taught herein is the so-called "Disk Pairing" or "DP" strategy 55 in FIG. 6. The DP strategy 55 places a movie A with a higher bit rate in the outer zone 780, 785 of two homogenous disks 60, 65, and a second movie B with lower bit rate in the inner zones 790, 795 of these two disks 60,65, given both movies are broadcast at the same repeat interval t. Specifically, DP strategy place the first half of movie A 780 (i.e. the first half of the segment sequence in FIG. 1A) on disk 1 60, starting from the outermost zone followed by the first half of movie B 790 on the inner zone of disk 1 60. Disk 2 65 contains the second half of movie A, starting from the outermost zone 785, followed by the second half of movie B in the inner zone 795. Both disks repeat the sweeping pattern from beginning to end as previously described. Disk sweeping time is equal to the broadcast repeat interval, t, regardless of movie length and bit rate. Thus, the system will work properly if the sweep start times of the two disks are set apart by an offset of t/2 minutes. While disk 1 is transferring data for movie A from the outer zones, disk 2 is broadcasting movie B from the inner zones. Some t/2 minutes later, disk 1 sweeps to movie B in the inner zones, disk 2 sweeps to movie A in the outer zones, thereby continuing the broadcast. Equation 5 sets forth the relationship between the maximum allowed bit rates for movies A and B relative to the disk outer zone and inner zone bandwidths.

Further Example:

A pair of drives can store and broadcast two 2 hour movies at 10 minute repeat intervals and these two movies can be coded at a maximum of 4.6 Mb/sec and 3.4 Mb/sec, respectively. Alternatively, if the basic layout strategy is used, both movies must be coded at a maximum of 3.4 Mb/sec. Thus the overall effective disk bandwidth by using the DP strategy is Beff=6 MB/sec, which is 17% higher than that achievable by using the basic layout strategy.

The same paradigm can also be used for a long movie and a shorter movie, in the event both are broadcast at t-minute intervals. In this case, more streams are needed for the long movie (see Equation 1) which implies more data segments need to be transferred within a service round period of T. Therefore, more bandwidth is needed for the long movie. To continue with the preceding example, if both movies are coded at a 4 Mb/sec rate, then the bandwidth of a pair of such disks can support broadcast of a 138 minute movie and a 102 minute movie (assuming the capacity requirement can be met). If each movie is stored on a single disk, then the disk bandwidths allows broadcast of only two 102-minute movies.

Finally, while this paradigm can be extended to three or more disks for further fine tuning, the benefits achievable may be limited. On the other hand, storing movies on multiple disks increases movie unavailability (assuming no RAID), since any disk failure stops the broadcast. Therefore, while further multiple disk layouts are possible, disk pairing is recommended.

Tape or Compact Disk (CD) as a Primary Storage Medium

While disks featured as the primary storage medium in all foregoing discussions, tapes may also be used as a storage medium. Tapes have the advantage of low cost but pose other challenges as discussed herein.

Using the data layout strategy (FIG. 1A) the access pattern to storage medium is strictly sequential. Tapes may be the primary storage medium and video may be read directly from the tapes. Whereas in disk storage, the sweep from the outermost to innermost zone takes t minutes followed by a "jump" to the start position, tape "jump" is a rewind to the tape beginning. With sufficient bandwidth and speed, tape rewind delay may not necessarily be a problem. If, for example, a movie broadcast requires 4.5 MB/sec of bandwidth (the equivalent of a 2 hour movie coded at 3 Mb/sec rate and broadcast at 10 minute intervals) and the tape has 9 MB/sec of bandwidth, then the idle periods in the service round at the end and beginning of the tape may be long enough to cover the rewind time, depending on the tape rewind speed. If the tape rewind is too slow, then two tape drives should support the broadcast of one movie, thereby doubling tape cost. Currently, the cost ratio for tape media compared to disk is approximately 1:300. Therefore, the cost of tape drives, not the tape itself, is the major cost factor. In the event two tape drives cost less than one disk, tape can be more economical. On the other hand, if tape drive supports bi-directional read, i.e., it can continue read while "rewind", then the layout in FIG. 1 is directly applicable to tapes by placing the second half of the layout sequence in FIG. 1A for reverse read. Furthermore, whereas commercially released movies need to be loaded onto disks, commercial movies, already on tape, need only be inserted.

The layout strategy taught herein can also be applied to CD to support the direct broadcast from CD. In this case, there is no "rewind" delay as in tapes. If the CD bandwidth (which is continuously broadening as CD technology improves) can meet the broadcast bandwidth requirements, CD should be used as the primary storage media for NVOD servers to lower the system cost.

An Alternate NVOD Model

Figure 7:
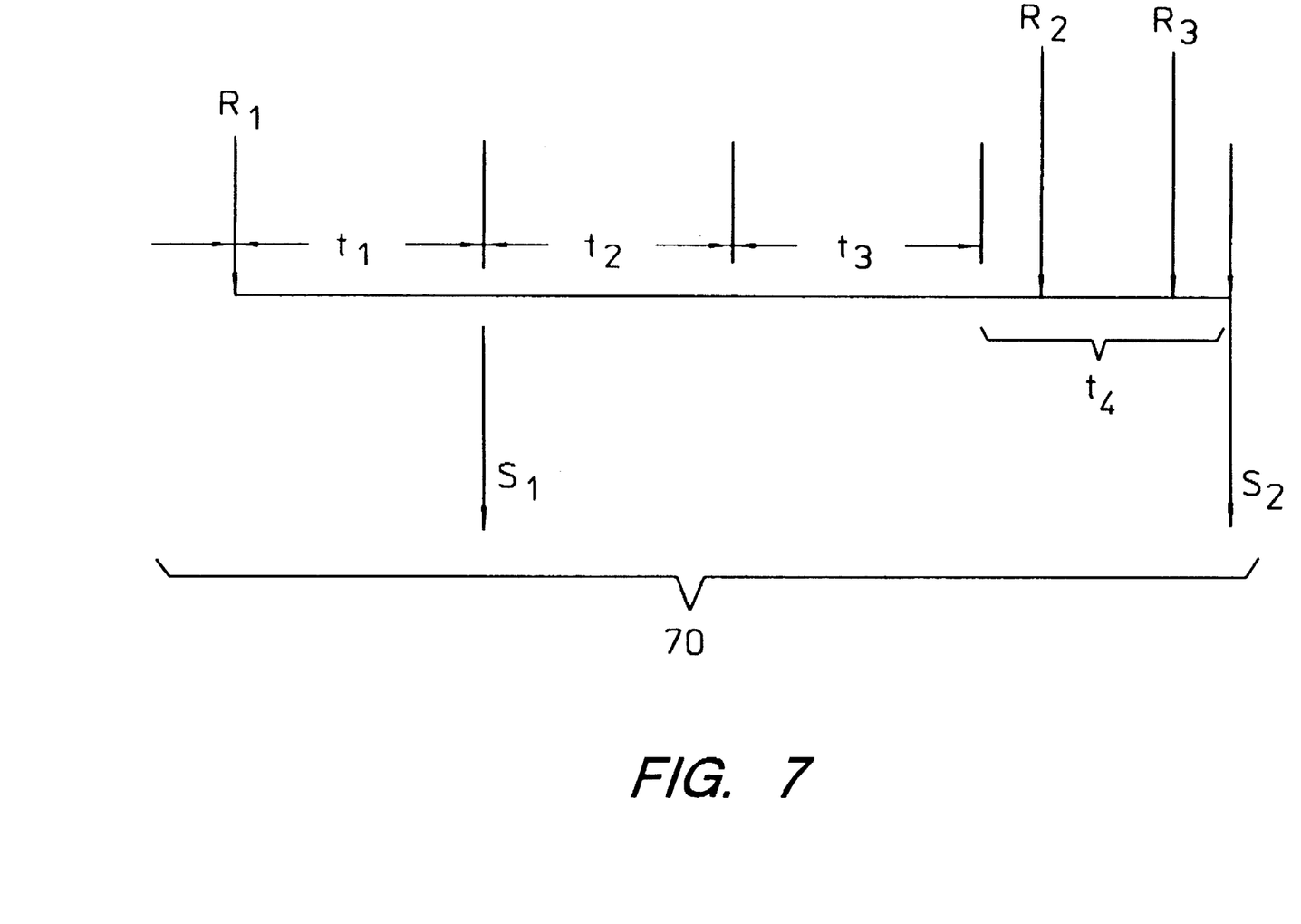
FIG. 7 is a schematic representation of an alternate embodiment of the invention taught herein wherein subscriber demand initiates performance broadcast within a maximum wait period determined by the number of available streams as predetermined based on number of concurrent streams possible.

All prior discussion has focused on a NVOD system wherein a regular repeat interval has been assumed. An alternate model for NVOD is a system that broadcast only after receiving a viewing request 70 as depicted in FIG. 7. Upon receipt of a request, $R_1$, the server delays for a predetermined period ,t1, before initiating the first broadcast stream, S1. The server then collects all further viewing requests to the same movie in incremental periods of t (t2, t3, . . . ). If during subsequent t periods, no requests are received, no stream is initiated. However, where requests are received during a time period as illustrated by R2 and R3 received in t4, the server initiates one stram, S2 at the end of period t4. Thus no viewer ever suffers a delay of greater than t after initiating a request to view a selection. Efficiencies are preserved because the server, rather than responding immediately, delays for a maximum period of t minutes, accumulating all requests to the same movie. At the completion of the waiting period, the server begins delivery of the requested movie stream to the distributed network and the stream is multicast to the requesting viewers. If more requests are received after the movie has begun, the server will commence a new stream after another waiting period of t minutes maximum. Since stream are begun only on demand, network bandwidth is conserved. However, no fast forward or fast back functions are available in this model.

The layout strategy taught herein applies to this alternate NVOD model (depicted in FIG. 7). Assuming a disk can deliver a movie at t minute intervals, then after the first request R1, the server starts a timer of t minutes. When t minutes have passed t1, the disk arm sweeps from outer to inner zones, taking t minutes for each sweep. Within each service round, however, only one segment is read. For example, during the first sweep, only segments 0, 1, 2 . . . n−1, during the second sweep, segments n, n+1 . . . . (as previously illustrated and discussed in connection with FIGS. 1B–1D). At any time, if there has been a new request R, then at the beginning of the next sweep, a new stream, S2 is started by reading segments 0, 1, 2, . . . . , along with the segments for the first stream, in their corresponding service rounds. In this way, the system can have a maximum of k simultaneous streams for this movie and the maximum waiting time for each viewing request is t minutes.

We claim:

1. A method for providing digitized performance exhibitions at predetermined intervals, comprising:

defining the concurrent streams required per performance request as a function of performance duration and interval frequency;

selecting at least one digital storage device such that said device capacity accommodates a known portion of at least one digitized performance;

laying out data on said digital storage device in a manner such that the data on the device is read sequentially, beginning with the first stream of the performance, wherein the step of laying out includes the steps of identifying segments of the digitized performance, and pairing or otherwise geographically coupling segments on predetermined physical locations on a digital storage medium, wherein two groups of segments are paired on the digital storage device;

reading data from the device such that each broadcast service round includes a reading of a first group of the paired segments and then a second group of the paired segments; and transmitting the digitized performance in a manner such that the transmission received is a digital version of the original digitized performance.

2. A method as in claim 1 wherein the step of selecting a digital storage device further includes the selection of a disk type storage device and wherein the step of laying out data on said disk type storage device is accomplished such that a single disk seek per sweep is required.

3. A method as in claim 1, further comprising the step of broadcasting said digitized performance, said step accomplished in a manner such that a plurality of buffers for each broadcast data stream is used, said buffers in combination sufficient, in relation to the available bandwidth, to ensure continuous data feed broadcast.

4. A method as in claim 3 wherein the broadcast step further comprises utilization of at least a pair of buffers for each data stream said buffer pair capable of providing for continuous transmission of digitized performance.

5. A digital data layout method as in claim 1 further comprising:

selecting a plurality of digitized performances; laying out on said digital storage device according to a predetermined order sequential segments of each digitized performance to create an interleaving of digital sequences, which, when read, generate discrete data streams with each stream consisting of a single digital performance.

6. A digital data layout method, comprising:

defining the data transfer unit per data transmission;

selecting at least one data storage device such that said device capacity and bandwidth bears a known relationship to the total data transmission;

laying out data on said data storage device in a predetermined manner, said manner enabling data to be read sequentially from the data storage device commencing with the first transfer unit of said data transmission, wherein the step of laying out includes the step of pairing or otherwise geographically coupling data transfer units on predetermined physical locations on a digital storage medium, wherein two groups of data transfer units are paired on the digital storage device such that each broadcast service round includes a reading of a first group of the paired data transfer units and then a second group of the paired data transfer units.

7. A digital data layout method as in claim 6 further comprising the step of selecting a plurality of data storage devices to accommodate, as an aggregate, the capacity and bandwidth requirements of the data transmission and the step of laying out said units on said plurality of data storage devices so as to read sequentially as between each of said plurality of storage device.

8. A digital data layout method as in claim 7 further comprising the step of selecting the digital storage device having a capacity that accommodates the entire data unit to be laid out and exceeds the data file size by the least feasible amount, thereby optimizing disk storage space usage.

9. A digital layout method whereby multiple digitized media performances may be placed on a single data storage device, comprising the steps of:

determining the broadcast interval of each of a plurality of digitized performances;

selecting at least one data storage device such that the device capacity and bandwidth exceeds the sum of the performance digital data requirements by a known multiple;

dividing each performance into digital data segments;

laying out the segments of each performance so that the device is read sequentially and a plurality of performance streams result in the simultaneous broadcast of said plurality of performances, thereby optimizing disk bandwidth usage, wherein the step of laying out includes the step of pairing or otherwise geographically coupling the digital data segments on predetermined physical locations on a digital storage medium, wherein two groups of digital data segments are paired on the digital storage device such that each broadcast service round includes a reading of a first group of the paired digital data segments and then a second group of the paired digital data segments.

10. A digital data layout method comprising the steps of:

selecting a plurality of digitized performances;

identifying segments of said plurality of digitized performances;

pairing or otherwise geographically coupling segments on predetermined physical locations on the digital storage medium wherein two groups of segments are paired on a digital storage device such that each broadcast service round includes a reading of a first group of the paired segments and then the second group of the paired segments.

11. A digital data layout method as in claim 10 wherein the step of selecting a digital storage device further includes the step of selecting a plurality of digital media storage devices are selected and whereupon at least one digitized work is laid out in such a manner that the disk sweep time is equal to the broadcast repeat interval.

12. A digital data layout method enabling the broadcast of two distinct digitized performances at the same interval comprising:

placing a first performance in the outer zones of a first and second disk;

placing a second performance in the inner zones of said first and second disk;

coordinating the sweep of the first and second disk arms on said first and second disks such that the offset of sweep time commencement is the broadcast interval (t) divided by two.

* * * * *